(12) United States Patent
Gulliksson et al.

(10) Patent No.: US 9,596,337 B2
(45) Date of Patent: Mar. 14, 2017

(54) DIRECTING AUDIO OUTPUT BASED ON DEVICE SENSOR INPUT

(71) Applicant: SONY CORPORATION, Tokyo (JP)

(72) Inventors: Johan Gulliksson, Bjarred (SE); Martin Sjolin, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 88 days.

(21) Appl. No.: 14/278,102

(22) Filed: May 15, 2014

(65) Prior Publication Data

US 2015/0207912 A1 Jul. 23, 2015

(30) Foreign Application Priority Data

Jan. 22, 2014 (WO) .................. PCT/IB2014/000055

(51) Int. Cl.
| | |
|---|---|
| H04M 1/725 | (2006.01) |
| H04W 24/08 | (2009.01) |
| H04M 1/60 | (2006.01) |
| G06F 13/10 | (2006.01) |
| G06F 3/16 | (2006.01) |
| G06F 3/01 | (2006.01) |

(52) U.S. Cl.
CPC .......... *H04M 1/7253* (2013.01); *G06F 3/017* (2013.01); *G06F 3/165* (2013.01); *G06F 3/167* (2013.01); *G06F 13/102* (2013.01); *H04M 1/6041* (2013.01); *H04M 1/72569* (2013.01); *H04M 1/72597* (2013.01); *H04W 24/08* (2013.01)

(58) Field of Classification Search
CPC ............. H04M 1/6058; H04M 1/6066; H04M 1/6075; H04M 1/6083; H04M 1/6091; H04M 2250/02; H04M 2250/04; H04M 2250/12; H04M 2250/22; G06F 3/01; G06F 3/16
USPC ..................... 455/426.1, 569.1, 569.2, 575.2
See application file for complete search history.

(56) References Cited

U.S. PATENT DOCUMENTS

| | | | | |
|---|---|---|---|---|
| 8,816,868 | B2 * | 8/2014 | Tan et al. .................. | 340/636.1 |
| 9,002,275 | B2 * | 4/2015 | Tubbesing ............ | H04W 4/008 455/41.2 |
| 2009/0003620 | A1 * | 1/2009 | McKillop et al. .............. | 381/80 |
| 2010/0202626 | A1 * | 8/2010 | Shiori ..................... | G06F 3/017 381/74 |
| 2013/0165046 | A1 | 6/2013 | McKillop et al. | |
| 2014/0297900 | A1 * | 10/2014 | Herbert et al. ................. | 710/16 |

(Continued)

FOREIGN PATENT DOCUMENTS

WO 2013098262 A1 7/2013

OTHER PUBLICATIONS

International Search Report dated Sep. 25, 2014, issued in the corresponding PCT application PCT/IB2014000055, 12 pages.

*Primary Examiner* — Anthony Addy
*Assistant Examiner* — Martin Chang
(74) *Attorney, Agent, or Firm* — Tucker Ellis LLP

(57) ABSTRACT

A first device determines whether there is an incoming call to the first device or an outbound call from the first device; performs at least two different acts, among a set of acts for monitoring a set of devices that include the first device and a second device; redirecting audio input and output at a first one of input/output (I/O) devices to a second one of the I/O devices based on the monitoring. The I/O devices include the plurality of devices.

14 Claims, 10 Drawing Sheets

(56) References Cited

U.S. PATENT DOCUMENTS

2015/0304022 A1* 10/2015 Murayama ............ H04W 8/005
455/41.2

* cited by examiner

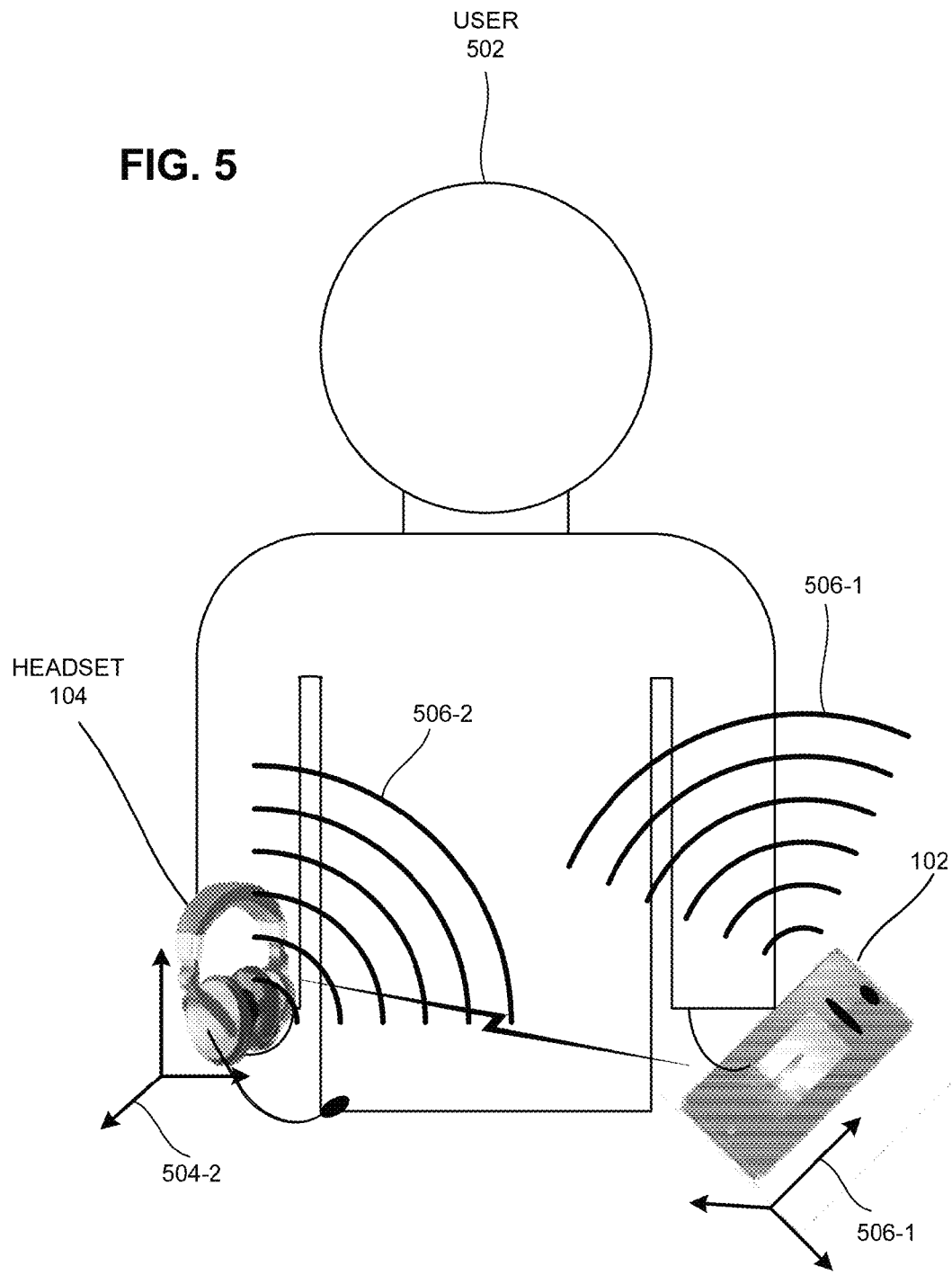

FIG. 6A

EVENT TABLE 600

602-1:

| RECORD NO. 606-1 | DEVICE 608-1 | RELATIVE LOCATION 610-1 | AMBIENT NOISE 612-1 | PAIRED DEVICES 622-1 | ACTION 624-1 |
|---|---|---|---|---|---|
| 1 | D1 | N/A | N/A | D1 & D2 | TO D1 |
| DIRECTION 614-1 | GESTURE 616-1 | CALL TYPE 618-1 | CONTACT TYPE 620-1 | | |
| TOWARD | HOLDING | INCOMING | PUBLIC | | |

602-2:

| RECORD NO. 606-2 | DEVICE 608-2 | RELATIVE LOCATION 610-2 | AMBIENT NOISE 612-2 | PAIRED DEVICES 622-2 | ACTION 624-2 |
|---|---|---|---|---|---|
| 2 | D1 | N/A | N/A | D1 & D2 | TO D2 |
| DIRECTION 614-2 | GESTURE 616-2 | CALL TYPE 618-2 | CONTACT TYPE 620-2 | | |
| AWAY | HOLDING | INCOMING | PUBLIC | | |

602-3:

| RECORD NO. 606-3 | DEVICE 608-3 | RELATIVE LOCATION 610-3 | AMBIENT NOISE 612-3 | PAIRED DEVICES 622-3 | ACTION 624-3 |
|---|---|---|---|---|---|
| 3 | D1 | CAR:D3 | NONE | D1 & D3 or D2 & D3 | DECOUPLE FROM D3; TO D1 |
| DIRECTION 614-3 | GESTURE 616-3 | CALL TYPE 618-3 | CONTACT TYPE 620-3 | | |
| TOWARD | HOLDING | INCOMING | PRIVATE | | |

FIG. 6B

EVENT TABLE 600

| RECORD NO. 606-4 | DEVICE 608-4 | RELATIVE LOCATION 610-4 | AMBIENT NOISE 612-4 | PAIRED DEVICES 622-4 | ACTION 624-4 |
|---|---|---|---|---|---|
| 4 | D1 | CAR:D3 | NONE | NONE | PAIR WITH D3; TO D3 |
| DIRECTION 614-4 | GESTURE 616-4 | CALL TYPE 618-4 | CONTACT TYPE 620-4 | | |
| AWAY | HOLD | INCOMING | PUBLIC | | |

602-4

| RECORD NO. 606-5 | DEVICE 608-5 | RELATIVE LOCATION 610-5 | AMBIENT NOISE 612-5 | PAIRED DEVICES 622-5 | ACTION 624-5 |
|---|---|---|---|---|---|
| 5 | D2 | CAR:D3 | HIGH | D1 & D2 | PAIR WITH D3; TO D3 |
| DIRECTION 614-5 | GESTURE 616-5 | CALL TYPE 618-5 | CONTACT TYPE 620-5 | | |
| AWAY | HOLD | INCOMING | PUBLIC | | |

602-5

| RECORD NO. 606-6 | DEVICE 608-6 | RELATIVE LOCATION 610-6 | AMBIENT NOISE 612-6 | PAIRED DEVICES 622-6 | ACTION 624-6 |
|---|---|---|---|---|---|
| 6 | D1 | N/A | NONE | N/A | COMPLETE DIALING; TO D1 |
| DIRECTION 614-6 | GESTURE 616-6 | CALL TYPE 618-6 | CONTACT TYPE 620-6 | | |
| N/A | DIAL | OUTGOING | N/A | | |

EVENT TABLE 600

603-7

| RECORD NO. 606-7 | DEVICES 626-7 | RELATIVE LOCATION 610-7 | MICRO-PHONES 628-7 | PROXI-MITY 630-7 | EVENT COUNT 638-7 | |
|---|---|---|---|---|---|---|
| | | | | | D1 | D2 |
| 11 | D1, D2 | N/A | D1 | D1 | 24 | 1 |
| VOLUME BUTTON 632-7 | TOUCH-SCREENS 634-7 | OTHER TOUCH 636-7 | GESTURE 616-7 | CONTACT TYPE 620-7 | | |
| NONE | NONE | NONE | N/A | N/A | | |

603-8

| RECORD NO. 606-8 | DEVICES 626-8 | RELATIVE LOCATION 610-8 | MICRO-PHONES 628-8 | PROXI-MITY 630-8 | EVENT COUNT 638-8 | | |
|---|---|---|---|---|---|---|---|
| | | | | | D1 | D2 | D3 |
| 12 | D1, D2, D3 | CAR | N/A | N/A | 10 | 1 | 3 |
| VOLUME BUTTONS 632-8 | TOUCH-SCREENS 634-8 | OTHER TOUCH 636-8 | GESTURE 616-8 | CONTACT TYPE 620-8 | | | |
| NONE | D3 | D3 | N/A | N/A | | | |

603-9

| RECORD NO. 606-9 | DEVICES 626-9 | RELATIVE LOCATION 610-9 | MICRO-PHONES 628-9 | PROXI-MITY 630-9 | EVENT COUNT 638-9 | |
|---|---|---|---|---|---|---|
| | | | | | D1 | D2 |
| 13 | D1, D2 | N/A | D1 or D2 | D1 or D2 | 32 | 3 |
| VOLUME BUTTON 632-9 | TOUCH-SCREENS 634-9 | OTHER TOUCH 636-9 | GESTURE 616-9 | CONTACT TYPE 620-9 | | |
| D1 | NONE | NONE | N/A | N/A | | |

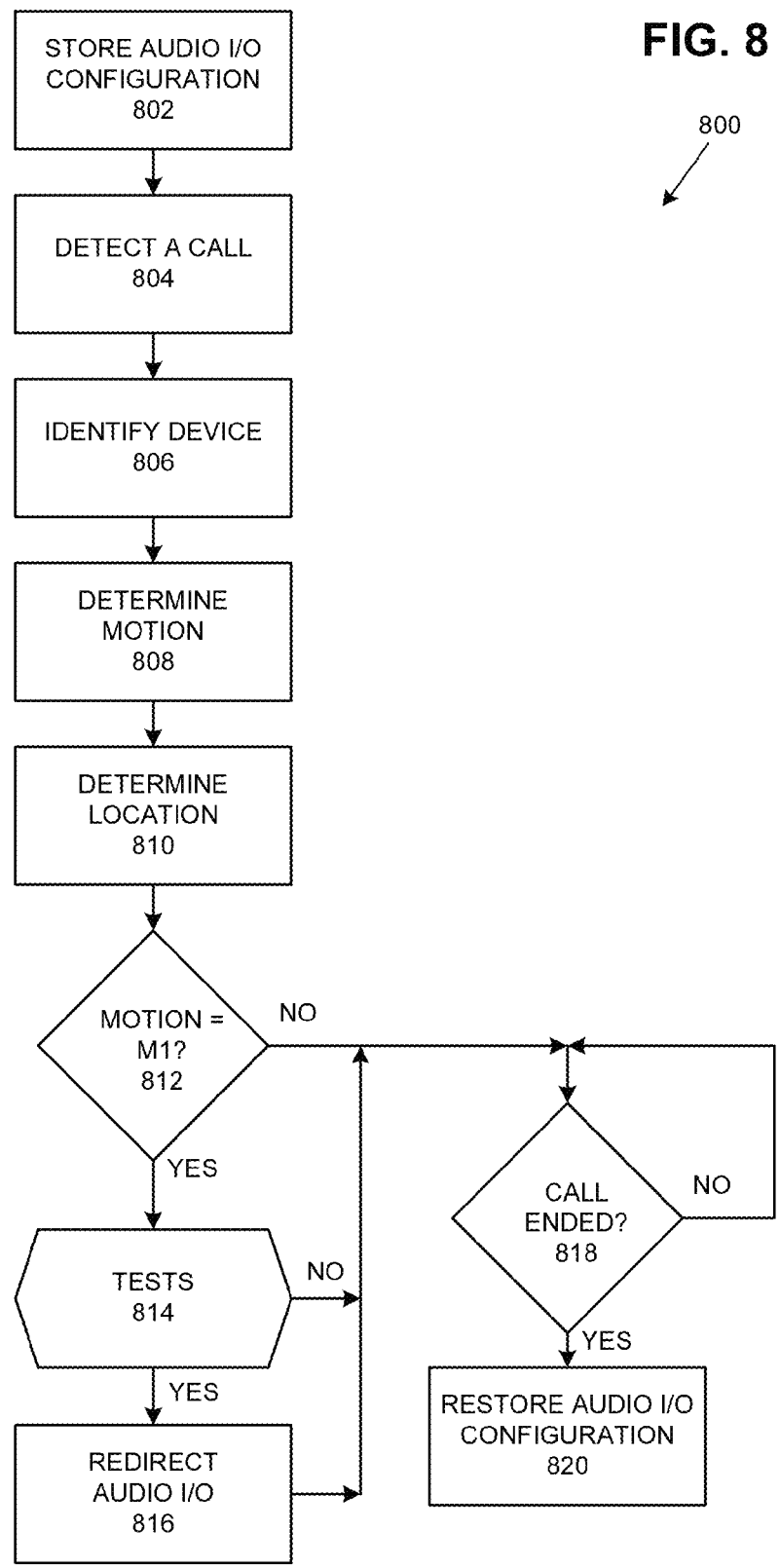

DIRECTING AUDIO OUTPUT BASED ON DEVICE SENSOR INPUT

RELATED APPLICATION

This application claims priority to International Application PCT/IB2014/000055, with an International filing date of Jan. 22, 2014, to be published in English under PCT Article 21(2), the disclosure of which is incorporated herein by reference.

SUMMARY

According to one aspect, a first device may include a memory to store instructions and a processor. The processor may be configured to execute the instructions to: determine whether there is an incoming call to the first device or an outbound call from the first device; perform at least two different acts, among a plurality of acts for monitoring a plurality of devices that include the first device and a second device; and redirect audio input and output at a first one of input/output (I/O) devices to a second one of the I/O devices based on the monitoring. The I/O devices may include the plurality of devices.

Additionally, the first device may include one of: a smart phone; a tablet computer; a computer; a laptop computer. The second device may include one or more of: a headset; speakers; a microphone; or a head-mounted display.

Additionally, the plurality of acts for monitoring the plurality of devices may include: detecting motions of the first device and the second device; and identifying a device, among the plurality of devices, that includes a microphone to which speech is directed.

Additionally, when the processor identifies the device, among the plurality of devices, that includes a microphone to which the speech is directed, the processor may select a device receiving speech input with a highest signal-to-noise ratio.

Additionally, the plurality of acts for monitoring the plurality of devices may include: identifying a device, among the plurality of devices, that includes a touch screen being touched by a user; and identifying a device, among the plurality of devices, that includes a microphone to which speech is directed.

Additionally, the plurality of acts includes: identifying a device, among the plurality of devices, that includes a volume control being operated; and identifying a device, among the plurality of devices, that includes a touch screen being touched.

Additionally, the plurality of acts may include: identifying a device, among the plurality of devices, that is proximate to a user of the devices; and identifying a device, among the plurality of devices, whose power level is low.

Additionally, when the processor identifies the device proximate to the user of the devices, the processor is to identify the device whose distance from the user is smaller than each of distances, of the other devices, from the user.

Additionally, the first device of may further include a component that includes at least one of: an accelerometer, a camera, a compass, a proximity sensor, a gyroscope, touch sensors, and a microphone. When the processor performs the at least two different acts, the processor may receive and process output of the component.

Additionally, the second device may include a component that includes at least one of: an accelerometer, a camera, a compass, a proximity sensor, a gyroscope, a microphone, and a sensor for determining whether the second device is being worn on a user's head. When the processor performs the at least two different acts, the processor may receive and process output of the component.

Additionally, the second device may be coupled to the first device via one of: a Bluetooth communication link; or a communication link over a cable or a wire.

Additionally, the devices may further include a third device, among the devices, that is paired with the first device. When the processor redirects the audio input and output, the processor may causes the first device to decouple from the third device, and may direct the audio input and output to the first device.

According to another aspect, a method may include: determining whether there is an incoming call to a first device or an outbound call from the first device; performing at least two different acts, among a plurality of acts for monitoring devices that include the first device and a second device; and redirecting audio input and output at a first one of input/output (I/O) devices to a second one of the I/O devices based on the monitoring. The I/O devices may include the devices.

Additionally, the plurality of acts for monitoring the devices may include: detecting motions of the first device and the second device; and identifying a device, among the devices, that includes a microphone to which speech is directed.

Additionally, the identifying the device, among the devices, that includes the microphone to which the speech is directed may include selecting a device receiving speech input with a highest signal-to-noise ratio.

Additionally, the plurality of acts for monitoring the devices may include: identifying a device, among the devices, that includes a touch screen is touched by a user; and identifying a device, among the devices, that includes a microphone to which speech is directed.

Additionally, the plurality of acts may include: identifying a device, among the devices, that includes a volume control being operated; and identifying a device, among the devices, that includes a touch screen being touched.

Additionally, the plurality of acts may include identifying a device, among the devices, that is proximate to a user of the devices; and identifying a device, among the devices, whose power level is low.

Additionally, the identifying the device proximate to the user of the devices may include identifying a device whose distance from the user is smaller than each of distances, of the other devices, from the user.

According to yet another aspect, a tangible computer-readable storage device may include one or more computer-executable instructions. When executed by one or more processors, the computer-executable instructions may cause the one or more processors to: determine whether there is an incoming call to the first device or an outbound call from the first device; perform at least two different acts, among a plurality of acts for monitoring a plurality of devices that include the first device and a second device; and redirect audio input and output at a first one of input/output (I/O) devices to a second one of the I/O devices based on the monitoring, The I/O devices may include the plurality of devices.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 5 illustrates exemplary operation of the user device of FIG. 1;

FIGS. 6A and 6B illustrate an exemplary table of events according to one implementation;

FIG. 6C illustrates another exemplary table of events according to another implementation;

FIG. 8 is a flow diagram of another exemplary process that is associated with the user device of FIG. 1.

DETAILED DESCRIPTION

The following detailed description refers to the accompanying drawings. The same reference numbers in different drawings may identify the same or similar elements.

As used herein, the term "pairing" refers to two devices agreeing to communicate with one another based on a communication protocol or technology. For example, two Bluetooth devices are paired (or "Bluetooth paired") when the devices agree or are ready to communicate with each other. Conversely, as used herein, the term "un-pairing" refers to two paired devices becoming no longer paired. Furthermore, depending on the context, the terms "decouple," or "decoupling" are used synonymously with "un-pair" or "un-pairing," respectively. Depending on the context, the term "pairing" may refer to the pairing as described above as well as establishing a session.

As used herein, the term "headset" may refer to: a pair of headphones; a combination of headphones and a microphone attached thereto; a combination of a headphone, a microphone, and an optical head-mounted display (e.g., display glasses, mirrors, waveguides, etc.); a combination of a headphone and an optical head-mounted display, etc. Also as used herein, depending on the context, the term "headphones" may be used synonymously with the term "headset."

In addition, as used herein, the phrase "redirecting audio input and/or output" to a device may refer to causing the device to provide the audio input and/or output and causing other devices not to provide the audio input/output. The phrase "redirecting audio input and/or output" does not refer to aiming a sound wave to/from the device. The phrase "directing audio input and/or output" to a device may refer to causing the device to provide the audio input and/or output.

In the following, depending on the context, descriptions that apply to the term "audio input and output (I/O)" may also be equally apply to audio visual (NV) I/O.

In the following, a user device may determine whether a user is about to use a peripheral device based on input from several sensors, as well as the user's gesture or motion. If the input and the gesture indicate that the user is about to use a peripheral device (e.g., headset), the user device itself, or another device, the user device may direct its audio I/O to the device about to be used.

Figure 1:
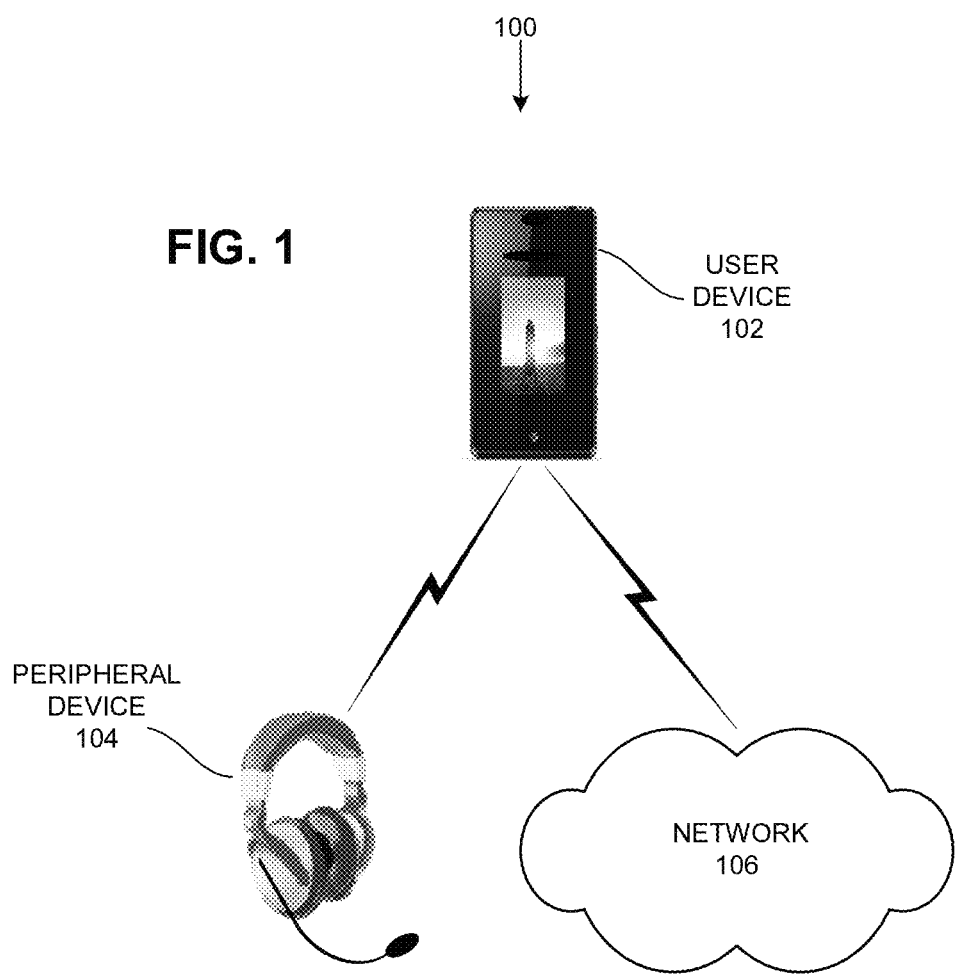
FIG. 1 illustrates an exemplary environment in which concepts described herein may be implemented.

FIG. 1 illustrates an exemplary environment 100 in which concepts described herein may be implemented. As shown, environment 100 may include a user device 102, a peripheral device 104, and a network 106.

User device 102 may include any of the following devices that have the ability to, or are adapted to, operate as a phone and to direct its audio and/or video output: a smart phone; or a cell phone; or a mobile telephone. User device 102 may also include a device with Voice-over-Internet Protocol (VoIP) capability, such as a personal computer, a tablet computer, a gaming device, a music-playing device, a laptop computer; a personal digital assistant (PDA); a digital camera; or another type of computational or communication device (e.g., a wrist-worn device, an in-vehicle system, etc.). User device 102 may establish a call session with another device over network 106.

Peripheral device 104 may include a headset, a headphone, microphone, projection glasses, etc., that is coupled to user device 102 via a cable or a cord, or, alternatively, paired with user device 102 over a wireless link. In one implementation, peripheral device 104 and user device 102 may be paired via a Bluetooth communication link.

Peripheral device 104 may sense its own movement and/or location, and generate movement/location information. Peripheral device 104 may transmit the movement/location information to user device 102.

User device and/or peripheral device 104 may include one or more sensors. Sensors included on user device 102 and/or peripheral device 104 may provide input (e.g., user's touch on its display or another portion of the device, proximity of the device to the user, detection of sound/voice by the device, etc.). The sensors may include capacitive touch sensor (e.g., on the display of user device 102, a portion of user device 102 other than the display, a portion of peripheral device 104 (e.g., ear phones), logic for detecting operation of volume control on either user device 102 or peripheral device 104, microphones (e.g., for detecting whether the user is speaking at user device 102 or peripheral device 104), a proximity detector determining a distance between the user and user device 102 and/or peripheral device 104, accelerometer and/or gyroscope for detecting the motion and/or the orientation of user device 102 and peripheral device 104, etc.).

Network 106 may include a cellular network, public switched telephone network (PSTN), local area network (LAN), wide area network (WAN), a wireless LAN, metropolitan area network (MAN), personal area network (PAN), Internet Protocol (IP) based High Speed Packet Access (HSPA) network, evolved HSPA network, Long Term Evolution (LTE) network, intranet, the Internet, satellite-based network, a fiber-optic network (e.g., passive optical networks (PONs)), an ad hoc network, any other network, or a combination of networks. Devices that are shown in FIG. 1 may connect to network 106 via wireless, wired, or optical communication links.

In FIG. 1, when the detected gesture, together with other information collected by sensors on user device 102 or peripheral device 104, indicates that the user is about to use user device 102 or peripheral device 104 (e.g., detect the movement of user device 102/peripheral device 104 toward the user's head, detect incoming telephone call, measure a distance between the user and the device, detect touch(es) on the devices, detect voices/sound from the user, etc.), user device 102 may reconfigure its audio (or A/V) I/O such that user device 102 receives/sends the audio (or A/V) I/O to the device about to be used.

In other implementations, when the detected gesture, together with other information collected by sensors on user device 102 or peripheral device 104, indicates that the user is about to stop using user device 102 or peripheral device 104 (e.g., detect movement of user device 102/peripheral device 104 away from the user's head, detect that the user no longer speaks into the microphone of one device and touches the display of another device, detects the user increasing the volume of either user device 102 or peripheral device 104, etc.), user device 102 may reconfigure its audio I/O, such that user device 102 reconfigures the audio I/O away from a device that is no longer being used.

The number and types of devices in FIG. 1 are exemplary. Depending on the implementation, environment 100 may include additional, fewer, different, or a different arrangement of components and devices than those illustrated in FIG. 1. For example, environment 100 may include thousands, millions, etc., of user devices 102 and peripherals 104. In another example, network 100 may include other types of devices and components, such as routers, switches, bridges, gateways, etc.

Figures 2A, 2B:
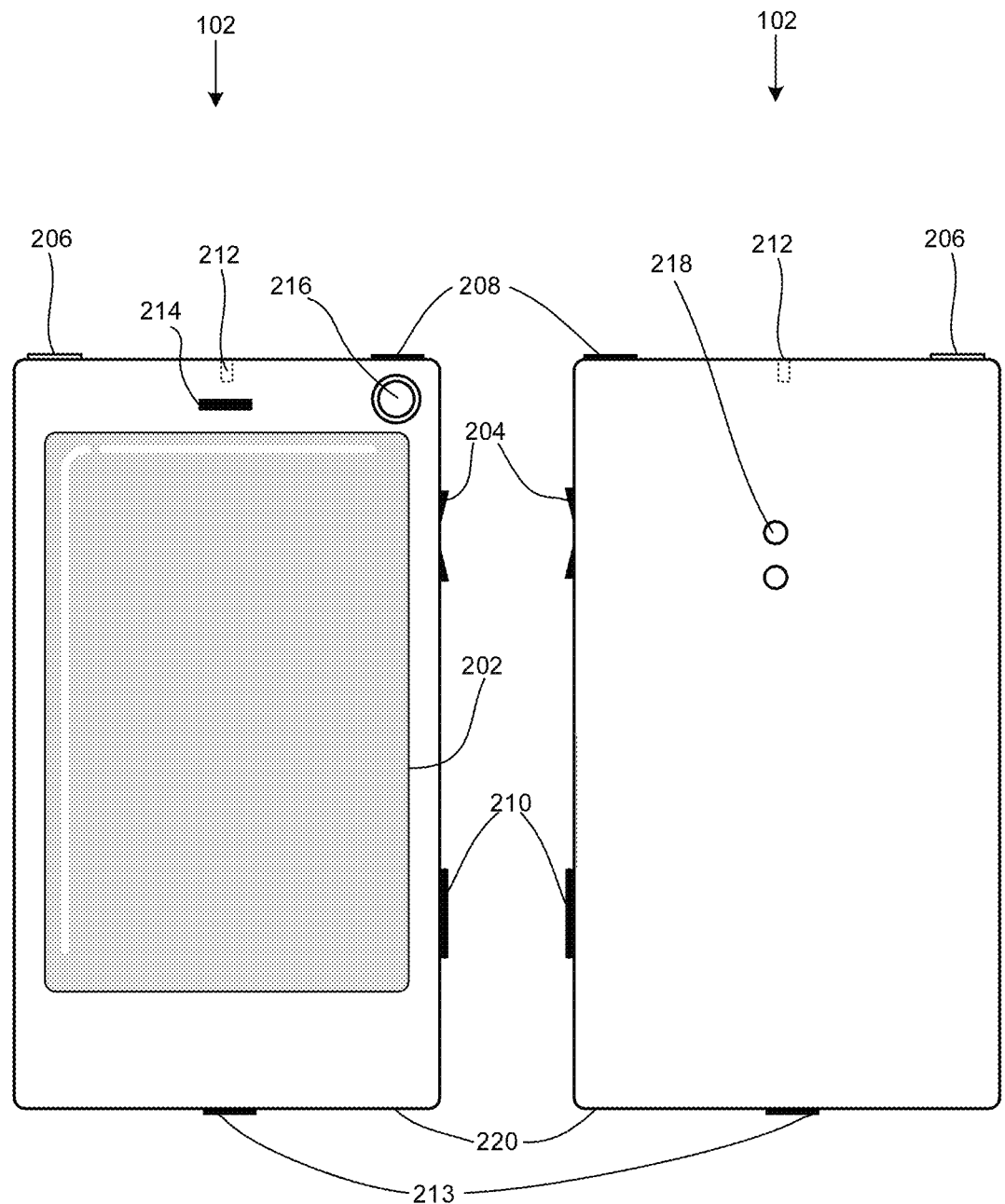
FIGS. 2A and 2B are front and rear views of an exemplary user device of FIG. 1.

FIGS. 2A and 2B are front and rear views of one implementation of user device 102. As shown in FIGS. 2A and 2B, user device 102 may include a display 202, volume rocker 204, awake/sleep button 206, a data/charging port 208, camera button 210, speaker jack port 212, microphone/speaker 213/214, camera 216, sensors 218, and housing 220.

Display 202 may provide visual information to the user. Examples of display 202 may include a liquid crystal display (LCD), a plasma display panel (PDP), a field emission display (FED), a thin film transistor (TFT) display, etc. In some implementations, display 202 may also include a touch screen that can sense contacting a human body part (e.g., finger) or an object (e.g., stylus) via capacitive sensing, surface acoustic wave sensing, resistive sensing, optical sensing, pressure sensing, infrared sensing, and/or another type of sensing technology. The touch screen may be a single-touch or multi-touch screen.

Volume rocker 204 may permit a user to increase or decrease speaker volume. In some implementations, user device 102 may use information from volume rocker 204 to direct its audio or A/V I/O. Awake/sleep button 206 may put user device 102 into or out of the power-savings mode. In some implementations, awake/sleep button 206 may be replaced by an on/off button that turns user device 102 on or off.

Data/charging port 208 may allow user device 102 to communicate over, for example, a universal serial bus (USB), to another device. In some implementations, data/charging port 208 may also allow user device 102 to receive power, either from an adapter (e.g., an alternating current (AC) to direct current (DC) converter) or from another device (e.g., computer). Camera button 210 may send a signal to camera 216 to capture an image (e.g., cause a shutter to open/close).

Speaker jack port 212 may include a plug-in into which one may insert a speaker jack, so that signals from user device 102 can drive the speakers, to which speaker wires run from the speaker jack. In some implementations, a pair of headphones (or ear buds) whose speaker jack is inserted into speaker jack port 212 may be capable of sensing its own motion, its location, whether the headphones/earphones/ear buds are currently being used (e.g., whether the headphones are on the user's head, whether the ear buds are inserted into the user's ears, whether the user is touching or handling the headphones, etc.). Such headphones/earphones/ear buds may relay information obtained from the sensing to user device 102 via speaker jack port 212. Other types of headphones/earphones/earbuds may communicate the information via a wireless communication link.

Microphone/speaker 213/214 may receive audible information and/or sounds from the user and from the surroundings. In addition, microphone/speaker 213/214 may provide audible information from user device 102 to the user. Whether user device 102 uses microphone/speaker 213/214 depends on its dynamic configuration of its audio I/O. In one configuration, user device 102 may receives its audio input from microphone 213 and send its audio output to speaker 214. In a different configuration, user device 102 may receive its audio input from a peripheral (e.g., headset) and sends its audio output to the peripheral, over either a wired or wireless communication link.

Microphone 213 may receive audio input from the user. User device 102 may use such information to determine whether the user is speaking directly at user device 102 or to peripheral device 104. User device 102 may perform its dynamic reconfiguration of the audio or I/O partly based on the determination.

Front camera 216 may enable the user to view, capture, store, and process images of a subject in/at front of camera 216. In some implementations, a software application installed on user device 102 may receive an image of the user's head, face, mouth, or ears via front camera 216. User device 102 may use the information in determining whether the user is using/handling user device 102.

Sensors 218 may detect the distance between user device 102 and another object. For example, sensors 218 may determine proximity of user device 102 to user's body part, such as the user's head. Depending on the implementation, sensors 218 may include an infrared sensor, light sensor and/or ultrasound sensor.

Housing 220 may provide a casing for components of device 102 and may protect the components from outside elements.

Depending on the implementation, user device 102 may include additional, fewer, different, or a different arrangement of components than those illustrated in FIGS. 2A and 2B. For example, user device 102 may include additional sensors to collect and provide, to user device 102, information pertaining to user device 102 (e.g., lighting conditions) and/or information that is used to aid a user in capturing images (e.g., for providing information for auto-focusing). Furthermore, although not illustrated, user device 102 may include additional components, such as light bulbs/sources, emitting diodes (LEDs), etc.

Figure 3:
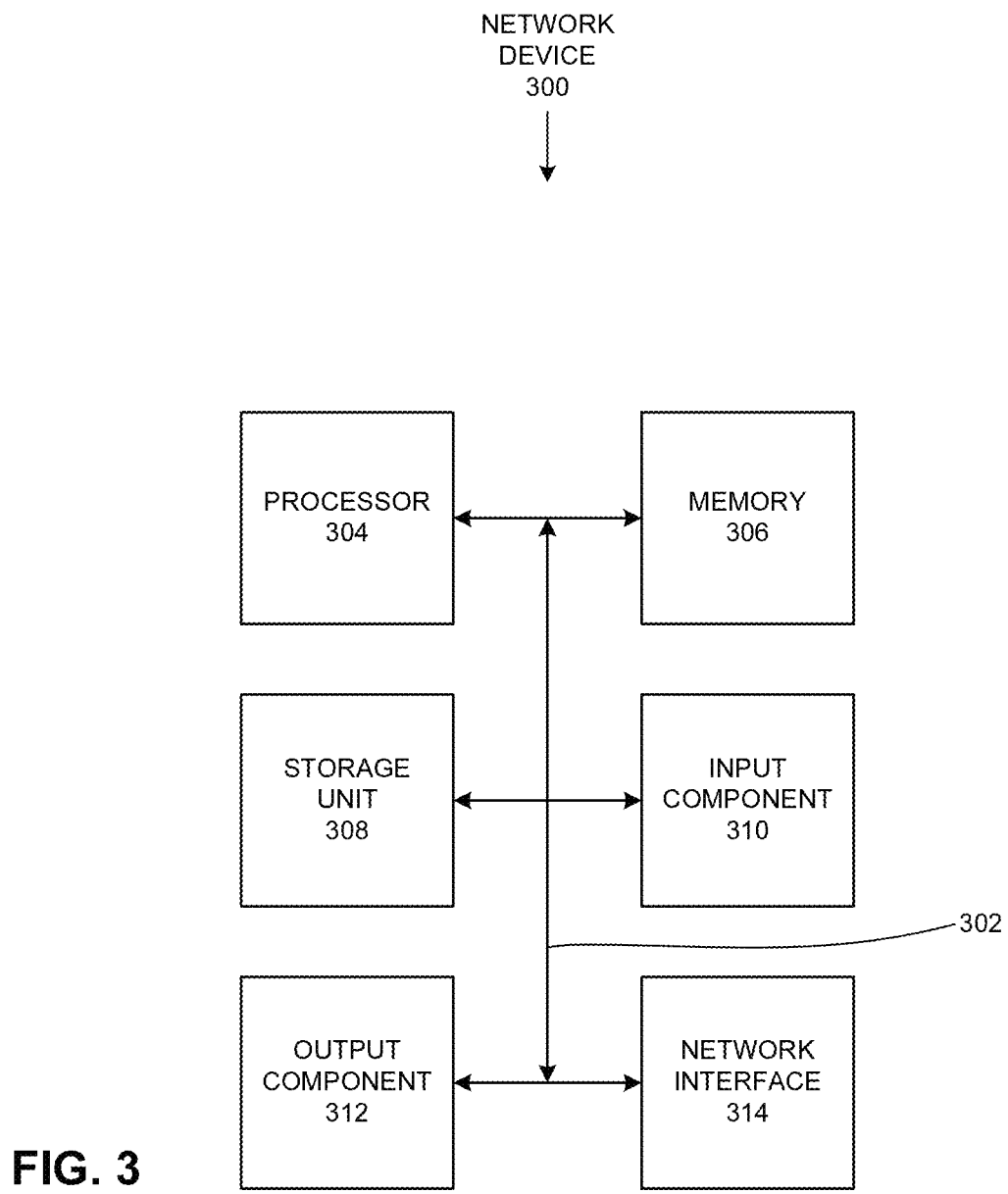
FIG. 3 is a block diagram of exemplary components of a device of FIG. 1.

FIG. 3 is a block diagram of a device 300. Network device 300 may represent user device 102 or peripheral device 104. As shown, network device 300 may include a communication path 302, processor 304, memory 306, storage unit 308, input component 310, output component 312, and network interface 314. In different implementations, network device 300 may include additional, fewer, or different components than the ones illustrated in FIG. 3.

Communication path 302 may provide an interface through which components of network device 300 can communicate with one another. Processor 304 may include a processor, a microprocessor, an Application Specific Integrated Circuit (ASIC), a Field Programmable Gate Array (FPGA), and/or other processing logic capable of controlling network device 300. Memory 306 may include static memory, such as read only memory (ROM), and/or dynamic memory, such as random access memory (RAM), or onboard cache, for storing data and machine-readable instructions.

Storage unit 308 may include a magnetic and/or optical storage/recording medium. In some embodiments, storage unit 308 may be mounted under a directory tree or may be mapped to a drive. Depending on the context, the term "medium," "memory," "storage," "storage device," "storage medium," and/or "storage unit" may be used interchangeably. For example, a "computer readable medium," "computer-readable storage device" and "computer readable storage medium" may refer to both a memory and/or storage device.

Input component 310 may permit a user to input information to network device 300. Input component 310 may include, for example, a keyboard, a keypad, a mouse, a pen, a microphone, a camera, a touch screen, voice recognition and/or biometric mechanisms, sensors, etc. Output component 312 may output information to the user. Output component 312 may include, for example, a display, a printer, a speaker, etc.

Network interface 314 may include a transceiver that enables device 300 to communicate with other devices and/or systems. For example, network interface 314 may include mechanisms for communicating via a network, such as the Internet, a mobile network, a terrestrial wireless network (e.g., a WLAN), a satellite-based network, a personal area network (PAN), a WPAN, etc. Additionally or alternatively, network interface 314 may include a modem, an Ethernet interface to a LAN, and/or an interface/connection for connecting network device 300 to other devices (e.g., a Bluetooth interface).

Network device 300 may perform the operations described herein in response to processor 304 executing software instructions stored in a non-transient computer-readable medium, such as memory 306 or storage unit 308. The software instructions may be read into memory 306 from another computer-readable medium or read from another device via network interface 314. The software instructions stored in memory 306 or storage unit 308, when executed by processor 304, may cause processor 304 to perform processes, functions, and/or operations that are described herein.

Figure 4:
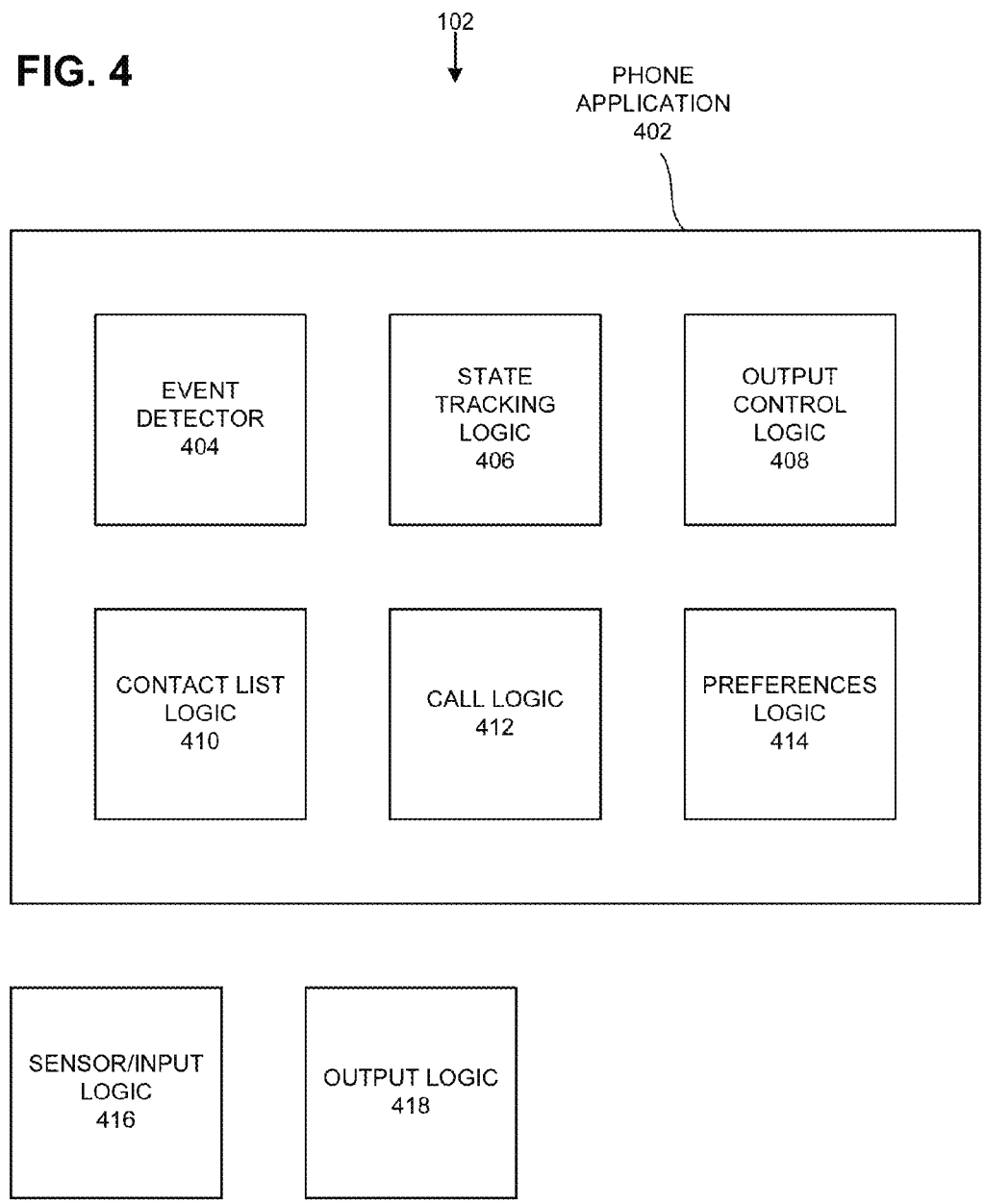
FIG. 4 is a block diagram of exemplary functional components of the user device of FIG. 1.

FIG. 4 is a block diagram of exemplary functional components of user device 102. As shown, user device 102 may include: a phone application 402, which in turn may include event detector 404, state tracking logic 406, output control logic 408, contact list logic 410, call logic 412, and preferences logic 414. User device 102 may also include sensor logic 416, and output logic 418.

Event detector 402 may detect change in one or more states of user device (e.g., a specific combination of states) that cause user device 102 to configure its audio I/O. When event detector 404 detects changes in states, event detector 404 may notify output control logic 408 of the occurrence (s). In some implementations, event detector 402 may be configurable to detect specific combinations of state changes (e.g., detect a change in state regarding a call, change in a device's proximity to user's head, detect a change in voice input, etc.).

State tracking logic 406 may track/monitor states of different components of user device 102 and/or peripheral device 104. The states may include, for example, active/inactive state (whether user device 102 is actively being used or not), call state (whether a call is ongoing or is being initiated), location (whether device 102/104 is inside a car, home, etc.), proximity state (e.g., whether device 102/104 is close to the user's head), whether device 102/104 is being touched on its display or another portion, whether device 102/104 is being spoken to via a microphone, whether a volume rocker/button on device 102/104 is being manipulated by the user etc.

To monitor/track states, state tracking logic 406 may receive the output of sensor/input logic 416 and monitor call logic 412. For example, state tracking logic 406 may receive the output of: a compass, a gyroscope and/or accelerometer in device 102/104; a camera assembly in user device 102, or an infrared sensor in device 102/104, to detect whether device 102/104 has moved close to the user's head (e.g., within a certain distance of the user's head); microphones on device 102/104 to detect to which device the user is speaking to (e.g., compare the volume of the user's voice on peripheral device 104 to user device 102); touch screen on user device 102 to determine whether the user is handling user device 102 or peripheral device 104; capacity sensor on peripheral device 104 or user device 102 to determine which device the user is handling; the volume button or rocker to determine which device 102/104 the user may be handling; etc. In another example, state tracking logic 406 may simply detect an incoming call and the motion of user device 102, based on whether the acceleration and distance moved are greater than a threshold acceleration and a threshold distance, respectively. State tracking logic 406 may notify event detector 404 of the change in state of one or multiple components of device 102/104.

Output control logic 408 may receive, from event detector 404, notifications/calls indicating an occurrence of an event. In accordance with the notification, output control logic 408 may configure the audio I/O of user device 102. For example, assume that output control logic 408 receives a notification, from event detector 404, that a user moved peripheral device 104 to the user's head (e.g., detected by a capacitive touch sensor on peripheral device 104) and began dialing a number. In such an instance, output control logic 408 may direct its audio I/O to peripheral device 104. Consequently, user device 102 may receive its audio input from the microphone of peripheral device 104 and not from its own microphone (e.g., microphone 213). User device 102 may also direct its output to the speakers on peripheral device 104, and not to speakers 214. In situations where peripheral device 104 (e.g., a hands-free device) includes a display, user device 102 may redirect not just audio I/O, but also visual I/O (e.g., a video feed).

Contact list logic 410 may store information for contacting a person, an organization, etc., based on user input. In addition, contact list logic 410 may access the contact information.

In one implementation, state tracking logic 406 or output control logic 408 may request contact list logic 410 to provide information. For example, state tracking logic 406 or output control logic 408 may request contact list logic 410 to look up the initial N-digits of a phone number and retrieve contact information associated with the number. State tracking logic 406 may use the retrieved contact information, for example, to determine whether the contact is "private" (e.g., a friend or relative) or "public" (e.g., business associate), assuming that the contact information differentiates "private" and "public" contacts. Such information may be used to determine whether to direct audio I/O to a headset (so that others cannot hear) or to speakers.

In another example, assume that output control logic 408 obtains five starting digits, of a phone number, that the user has input to user device 102 via sensor/input logic 416, and provides the digits to contact list logic 410. When contact list logic 410 retrieves the corresponding contact information, which includes the contact's full phone number, output control logic 408 may indicate to the user that user device 102 will complete the dialing for the user. User device 102 may then complete the dialing and initiate the call on behalf of the user.

Call logic 412 may place a call to another device in network 106 and/or receive a call from such a device. When call logic 412 receives a call, not only does call logic 412 perform routine tasks that are associated with handling incoming calls, but may also notify state tracking logic 406 that there is an incoming call or that a call session has been established. Similarly, when call logic 412 places a call, not only does call logic 412 perform routine tasks that are associated with placing the call, but also notifies state tracking logic 406 that there is an outgoing call or that a call session has been established. Call logic 412 may also notify state tracking logic 406 when a call terminates.

Preferences logic 414 may receive user preferences for configuring call logic 412 and output control logic 408 and modify the configuration of call logic 412 and/or output control logic 408 based on the user input. For example, preferences logic 414 may allow the user to place user device 102 in a "vibrate mode" instead of "ringtone mode." In another example, preferences logic 414 may allow a user to direct all audio I/O of user device 102 to an automobile's speakers/microphone via a Bluetooth communication link when the user and user device 102 are in the automobile.

Sensor/input logic 416 may receive input from hardware components of user device 102 and provide information in the input to other components of user device 102. For example, sensor/input logic 416 may obtain the output of a compass, a gyroscope and/or accelerometer in user device 102, determine the movement of user device 102 based on the output of the accelerometer, gyroscope, and/or compass, and relay information describing the movement to state tracking logic 406. In other examples, sensor/input logic 416 may obtain: images from a camera in user device 102 (e.g., front camera 216) and forward the images to state tracking logic 406; measurement of the distances between user device 102 and/or peripheral device 104; receive a signal from a volume button/rocker device 102/104; touch sensors on device 102/104 to indicate which device the user is holding; voice input from devices 102/104; etc.

Output logic 418 may relay information from components in user device 102 to output component 312 of user device 102, to peripheral device 104, and/or another device. For example, output logic 418 may relay audio information from a music player on user device 102 to speakers on user device 102 or on peripheral device 104. As described above, output control logic 408 may modify the configuration of output logic 418, such that audio I/O is directed to microphone/speakers on user device 102, on peripheral device 104, or on another device (e.g., automobile) in accordance with events detected by event detector 404.

Depending on the implementation, user device 102 may include additional, fewer, different, and/or a different arrangement of functional components than those illustrated in FIG. 4. For example, in one implementation, two or more functional components may perform the functions of a single functional component illustrated in FIG. 4. Conversely, in another implementation, a single functional component may perform functions of two or more functional components in FIG. 4. Furthermore, although not illustrated in FIG. 4, user device 102 may include other components, such as a communication component (e.g., a Transport Control Protocol IP stack), a digital filter, a digital signal processor, an operating system, device drivers, applications, etc.

FIG. 5 illustrates exemplary operation of user device 102. As shown, user device 102 and peripheral device 104, which may be paired, may be in proximity of user 502.

User device 102 and peripheral device 104 may be in a specific physical orientation, as illustrated by the local frame of reference 504-1 for user device 102 and the local frame of reference 504-2 for peripheral device 104. User device 102 and peripheral device 104 may each sense its orientation, and therefore, the orientations of their frames of reference 504. Peripheral device 104 may provides its orientation information to user device 102.

In addition, user device 102 and peripheral device 104 may detect their movements, user's touches, and user's voices. For example, when user 502 moves either user device 102 or peripheral device 104, user device 102 may detect the movement; when user touches user device 102/104 or speaks to its microphone, user device 102 may detect the user's touch or the user's voice.

As discussed above, both user device 102 and peripheral device 104 may sense their proximity to user 502, via sensor outputs 506-1 and 506-2. Thus, when user 502 moves peripheral device 104 toward the user's head, user device 102 may receive images captured by peripheral device 104, infrared sensor input/output of peripheral device 104, and/or acoustical input/output of peripheral device 104. Based on the image and sensor information (e.g., touch or voice information) from peripheral device 104, user device 102 may determine that peripheral device 104 is in the proximity of user 502 and/or that is about to be used. In some implementations, peripheral device 104 may include sensors that sense its contact with user 502's head.

When user device 102 determines that peripheral device 104 is on user 502's head (or more generally, being used), user device 102 may direct audio I/O to peripheral device 104. Similarly, when user device 102 determines that user device 102 is moving toward the user's head, user device 102 may redirect the audio I/O to user device 102 itself.

In some implementations, reconfiguring the audio I/O may be performed only when there is an incoming call or an outbound call. In such implementations, merely moving peripheral device 104 toward user 502's head would not result in user device 102 redirecting the audio I/O to peripheral device 104. User device 102 would need to detect both an incoming call as well as other state changes in peripheral device 104 (e.g., detect user 502 wearing peripheral device 104 on the user's head; detect the user speaking into its microphone; and/or detect the user's touch).

Depending on the area/locale in which user device 102 is located, user device 102 may apply different logic to direct its audio I/O. For example, assume that user device 102 is inside a car or at another location, in which user device 102 is paired with a microphone and speakers associated with the locale. When user device 102 detects that user device 102 or peripheral device 104 is moving toward the user's head/ears (or is at the user's head or ears), user device 102 may redirect its audio I/O from the microphone/speakers associated with the locale to the microphone/speakers of either user device 102 or peripheral device 104.

In FIG. 5, user device 102 may reconfigure or redirect its audio I/O based on state variables. For peripheral device 104 that includes a display as well as a microphone/speakers, user device 102 may redirect its video I/O (e.g., video feed and camera input) as well as its audio I/O.

In FIG. 5, user device 102 may reconfigure or redirect its audio I/O when event detector 402 in user device 102 detects an event that comprises occurrences of a specific set of values for user device state variables. Thus, the detection of the event involves detecting parameter values for the state variables. The manner in which user device 102 detects such parameter values depends on its implementation.

For example, in one implementation, event detector 402 may include hard-coded sequence of detection modules. Each module may detect a specific set of states for redirecting audio I/O. In a different implementation, event detector 402 may perform a lookup of different sets of state parameters in a table of events.

FIGS. 6A and 6B illustrate an exemplary table 600 of events according to one implementation. As shown, table 600 includes 6 records, 602-1 through 602-6 (collectively "records 602" and generically "record 602"). Each record 602 corresponds to an event that occurs when a set of state variable values attain specific values provided in the record 602.

As shown, record 602-1 may include record number field 606-1, device field 608-1, relative location field 610-1, ambient noise field 612-1, direction field 614-1, gesture field 616-1, call-type field 618-1, contact type field 620-1, paired devices field 622-1, and action field 624-1. Other records 602-2 through 602-6 may include the same type of fields as record 602-1. Each of the fields 608 through 622 and its value correspond to a state variable of user device 102 and the value that the state variable has to attain, for an event corresponding to the record to occur. Accordingly, when the values of state variables of user device 102 match the values of the corresponding fields 608-622 in a record 602, event detector 404 may notify output control logic 408 of the event. Thereupon, output control logic 408 may perform the action(s) specified in action field 624 of the record 602.

Record number field 606 stores a value (e.g., string, number, etc.) that identifies the record in which target state variable values are stored. Device field 608 includes an identifier for a device whose motion or input is required for the event identified by record number field 606 to occur. Relative location field 610 identifies the relative location of the device in an event corresponding to record 602. Ambient noise level field 612 specifies the ambient noise level of an event corresponding to record 602.

Direction field 614-1 indicates the direction of movement of the device identified by device field 608 (if there is a movement). Gesture field 616-1 indicates the type of gesture or movement associated with the device identified by device field 608. The gesture may include, for example, dialing a number on the device, holding and moving the device, etc.

Call type field 618 may indicate whether a call is an incoming call or an outgoing call. Contact type field 620 may identify whether the party with whom the user communicates is "private" (the user does not want another to overhear—herein also referred to as PRIVATE) or "public" (the user does not care whether another overhears the phone conversation—herein also referred to as PUBLIC).

Paired devices field 622 may indicate the devices that are paired at the start of the event (e.g., user device 102 and peripheral device 104). Action field 624 may specify the actions that user device 102 is to take when the event occurs (e.g., the states of user device 102 (and devices with which user device 102 is paired) match the values specified in fields 608 through 622).

Referring to FIG. 6A, record 602-1 specifies the following conditions/states: there is an incoming call from a PUBLIC party; and the user holds device D1 and moves device D1 toward the user's head (see direction field 614-1). Device D1 is paired with device D2. Upon detecting the occurrence of these conditions, D1 or D2 directs the audio I/O to D1, as indicated by field 624-1. If D1 and D2 represent user device 102 and peripheral device 104, respectively, the audio I/O is directed to the microphone and speakers of user device 102. Similarly, if D1 and D2 represent peripheral device 104 and user device 102, the audio I/O is directed to microphone and speakers of peripheral device 104 (e.g., headset).

Record 602-2 specifies the following conditions/states: there is an incoming call from a PUBLIC party; and the user holds device D1 and moves device D1 away from the user's head (see direction field 614-2). Device D1 is paired with device D2. Upon detecting the occurrence of these conditions, D1 or D2 directs the audio I/O to D2. If D1 and D2 represent peripheral device 104 and user device 102, respectively, the audio I/O is directed to the microphone and speakers of user device 102. Similarly, if D1 and D2 represent user device 102 and peripheral device 104, the audio I/O is directed to microphone and speakers of peripheral device 104.

Record 602-3 specifies the following conditions/states: there is an incoming call from a PRIVATE party; and the user inside a car holds device D1 and moves device D1 toward the user's head (see direction field 614-3). Either D1 or D2 is paired with D3. Upon detecting the occurrence of these conditions, D1 or D2 decouples its audio I/O from device D3 and directs its audio I/O to D1. If D1, D2, and D3 represent user device 102, peripheral device 104, and a hands-free device (e.g., a Bluetooth enabled device in the car), respectively, user device 102 is unpaired or decoupled from the hands free device, and its audio I/O is directed to the microphone and speakers of user device 102. Similarly, if D1, D2, and D3 represent peripheral device 104, user device 102, and the hands-free device, user device 102 is unpaired or decoupled from the hands free device, and its audio I/O is directed to microphone and speakers of peripheral device 104.

Referring to FIG. 6B, record 602-4 specifies the following conditions/states: there is an incoming call from a PUBLIC party; and the user inside a car holds device D1 and moves device D1 away from the user's head (see direction field 614-4). D1 is not paired with any other device. Upon detecting the occurrence of these conditions, D1 pairs with D3 and directs its audio I/O to D3. If D1, D2, and D3 represent user device 102, peripheral device 104, and the hands-free device, respectively, user device 102 pairs with the hands-free device and directs its audio I/O to the microphone and speakers of the hands-free device.

Record 602-5 specifies the following conditions/states: there is an incoming call from a PUBLIC party; and the user inside a car holds device D1 and moves device D2 away the user's head (see direction field 614-5). D1 is paired with D2. Upon detecting the occurrence of these conditions, D1 decouples its audio I/O from D2 and directs its audio I/O to D3. If D1, D2, and D3 represent user device 102, peripheral device 104, and the hands-free device, respectively, user device 102 decouples from peripheral device 104, and couples to the hands free device. User device 102 also directs its audio I/O to the microphone and speakers of the hands free device.

Record 602-6 specifies the following conditions/states: the user begins to dial a number to make an outgoing call. In such an instance, if the user has not completed the dialing and the number being dialed matches a unique entry in the contact list/address book in D1, then D1 may automatically complete the dialing. D1 may also direct its audio I/O to its microphone and speakers.

FIG. 6C illustrates another exemplary table of events 600 according to another implementation. As shown, table 601 includes three records, 603-7 through 603-9 (collectively "records 603" and generically "record 603"). Similar to table 600 in FIGS. 6A and 6B, each record 603 corresponds to an event that occurs when a set of state variable values attain specific values provided in the record 603.

As shown, record 603-1 may include record number field 606-7, devices field 626-7, relative location field 610-7, microphones field 628-7, proximity field 630-7, volume button field 632-7, touch screens field 634-7, other touch components field 636-7, gesture field 616-7, contact type field 620-7, and event count field 638-7. Record number field 606-7, relative location field 610-7, gesture field 616-7, and contact type field 620-7 store the same type of information as record number field 606-1, relative location field 610-1, gesture field 616-1, and contact type field 620-1 described above.

Devices field 626-7 field stores strings for identifying different devices that may be paired and/or communicate with one another after the pairing. Microphones field 628-7 identifies the device whose microphone is predominantly used compared to microphones of other devices. For example, assuming that both microphones on user device 102 and peripheral device 104 are active, microphones field 628-7 may identify the device whose microphone detects the user's voice the best (e.g., greatest signal-to-noise ratio).

Proximity field 630 may identify the device closest to the user's head (or the user's body). Volume button field 632-7 may identify the device whose volume control (hardware or software) that the user is touching or manipulating. Touch screens field 634-7 may identify the device whose display screen the user is touching. Other touch components field 636-7 may identify the device whose component (other than the display) the user is touching.

In FIG. 6C, the values in fields 628 through 636 is either "N/A" (not applicable), identifies a single device, or does not identify any device (e.g., "NONE"). In addition, although not shown in FIG. 6C, each of the fields can identify more than one device. For example, assuming that the signal-to-noise ratio of the user's voice detected at user device 102 and peripheral device 104 are approximately equal, microphones field 628-7 may identify both user device 102 and peripheral device 104.

Event count field 638-7 may store the number of times that the user, in the past, used one of the devices identified in devices field 626-7 when the state variable values of user device 102, peripheral device 104 (and any other device identified in devices field 628-7) matched the values in fields 628-7 through 636-7. Based on the values stored in event count field 638-7, user device 102 may determine the likelihood that the user will select a particular device for use.

For example, assume that an event occurs during which the values of the state variables of devices D1 (e.g., user device 102) and D2 (e.g., peripheral device 104) match those of record 603-7. Event count field 638-7 indicates that, in the past, the user selected D1 24 times and D2 only once when the values of the states variables matched those of record 603-7. Accordingly, the probability that the user will use D1 is $24/(24+1)=1/25=96\%$ and the user will use D2 is $1/25=4\%$. Accordingly, user device 102 may directly its audio I/O to D1.

In FIG. 6C, record 603-7 specifies the following conditions/states: devices D1 and D2 are paired; the user is speaking at D1; and the user is closer to D1 than to D2. Upon detecting the occurrence of these conditions, D1 would direct the audio I/O to D1, based on the event count field 638-7. If D1 and D2 represent user device 102 and peripheral device 104, respectively, the audio I/O would be directed to the microphone and speakers of user device 102.

Record 603-8 specifies the following conditions/states: there are 3 devices that may be paired with one another inside a car; and the user is touching the touch screen for D3 (e.g., display screen for hands-free device). Event count field 638-8 indicates that, in the past, given the state values specified in record 603-8, the user selected D1 10 times, D2 once, and D3 three times. Accordingly, when user device 102 (e.g., D1) detects the conditions specified in record 603-8, the user device (e.g., D1) would direct the audio I/O to D1.

Record 603-9 specifies the following conditions/states: there are 2 devices D1 and D2 that may be paired with one another; and the user is manipulating the volume control for D1. Event count field 638-9 indicates that, given such states, in the past, the user used D1 32 times and D2 three times. Therefore, upon detecting the state variable values specified in record 603-9, the user device (e.g., D1) would direct the audio I/O to D1.

In FIGS. 6A and 6B, table 600 is depicted as including records 602-1 through 602-6, which illustrate six exemplary types of events. In FIG. 6C, table 600 is depicted as including a different type of records, records 602-7 through 602-9, which illustrate three exemplary types of events. Thus, depending on the implementation, table 600 may include additional, fewer, or a different number of records. In addition, depending on the implementation, each of the records may include additional, fewer, or different fields/values than those illustrated in FIGS. 6A, 6B, and 6C. For example, in some implementations, record 602 may not include ambient noise field 612-1, contact type field 620 (e.g., public or private call type distinction), volume buttons field 622-7. In another example, record 602 may include a field that indicates whether a particular device is being worn on the user's head. For these implementations, the audio I/O may be rerouted with/without the information from the added/omitted fields.

In yet another example, record 602 may include a field that indicates whether the power level of a particular device is low. In such an instance, when a user holds a device (e.g., headset) whose power is low, user device 102 would detect the low power, and direct the audio I/O to user device 102. If user device 102 is inside a car and/or is already coupled with hands-free device, user device 102 may direct the audio I/O to the hands-free device.

Exemplary Processes

Figure 7:
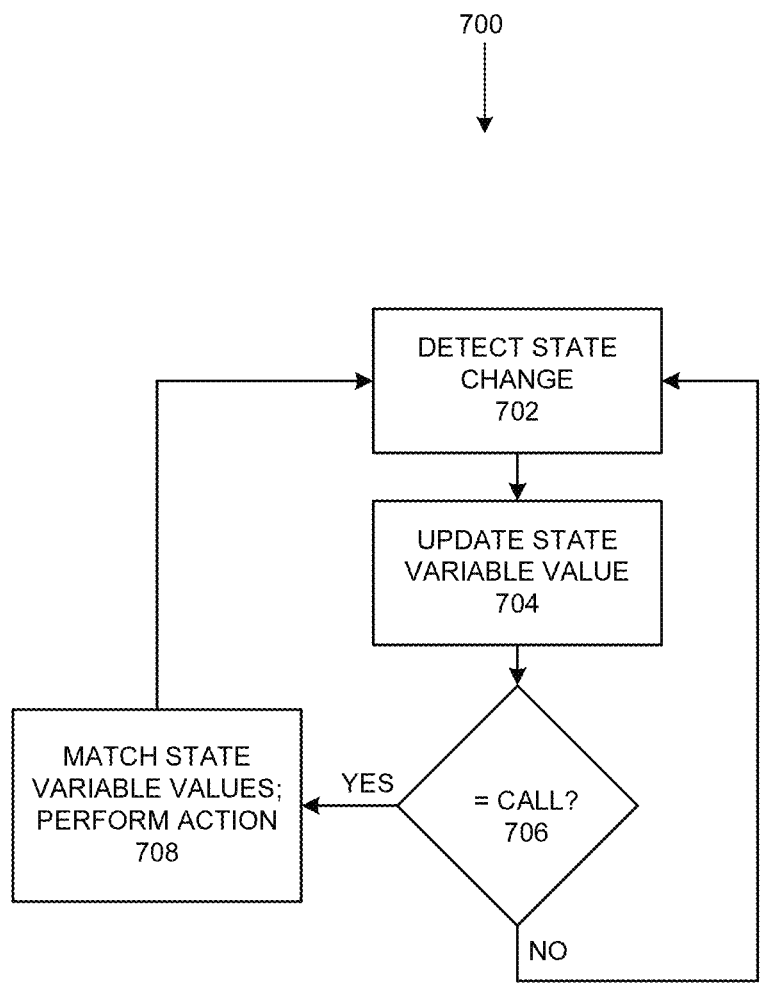
FIG. 7 is a flow diagram of an exemplary process that is associated with the user device of FIG. 1.

FIG. 7 is a flow diagram of an exemplary process 700 that is associated with user device 102. As shown, process 700 may include detecting a change in state (block 702). Detecting a state change may include detecting a change in state variable values of user device 102, peripheral device 104, and/or another device. As already discussed, the states may relate to ambient noise, the location of user device 102 and/or peripheral device, a direction, a gesture, etc.

In some implementations, user device 102 may include a table for tracking the current values of the state variables/parameters. Upon detecting the state change (block 702), user device 102 may update the state table with the latest state/parameter value (block 704).

User device 102 may determine if the state change includes an occurrence of an incoming/outgoing call (e.g., the user begins to dial a number; or there is an incoming call) (block 706). If the state change does not involve a call (block 706: no), process 700 may return to block 702, to monitor further changes in the values of the state variables. Otherwise (block 706: yes), process 700 may proceed to block 708.

At block 708, user device 102 may match the values, of its state variables, recorded in the table, to those in records of table 600. When there is a match between values recorded in the table to the values in a record 602, user device 102 may determine that the event associated with the record 602 is detected. Thereafter, user device 102 may perform the actions that are specified in action field 624 of the record 602.

In other implementations, user device 102 may detect the occurrence of an event in accordance with a process that detects, in effect, state transitions. In such implementation, when a state change occurs, user device 102 shifts from one state to another state.

In such implementations, the values of the state variables are recorded in a table/list, as in process 700. However, user device 102 also tracks, for each of the possible combinations of state values, a set of possible state transitions (due to a change in a state variable value) and actions associated with its arrival at the new state.

FIG. 8 is a flow diagram of another exemplary process 800 that is associated with the user device of FIG. 1. As shown, process 800 may include storing audio I/O configuration (block 802). Storing the audio I/O configuration may include, for example, storing the identifier of a device to which user device 102 is coupled/paired.

User device 102 may detect an occurrence of a call (block 804). For example, user device 102 may detect a call from remote device or detect the user dialing via a keypad on user device 102.

User device 102 may detect a device that is receiving input or is moving (block 806). For example, user device 102 may detect whether the user is moving peripheral device 104 or is inputting phone number into user device 102.

User device 102 may detect a user's gesture or motion (block 808). Depending on the implementation, the time window for detecting the motion/gesture may bracket or encompass the time of the detection of the call. When a motion/gesture is completed within the specified time window, user device 102 may determine that the motion/gesture is detected.

User device 102 may detect the gesture/motion in many different ways. For example, in one implementation, user device 102 may receive a signal from peripheral device 104 that includes a gyroscope/accelerometer/compass. When the user moves peripheral device 104, peripheral device 104 may send motion/orientation-related information to user device 102. In other implementations, peripheral device 104 may be implemented as a headset that includes either piezoelectric or mechanical components to detect whether peripheral device 104 is being worn on the user's head. Peripheral device 104 may send information relating such detection to user device 102. In addition, user device 104 may itself include components for detecting its own motion and/or user input. As described above, such components may include accelerometer, compass, gyroscope, proximity sensors, a camera, soft-keys (for detecting numerical input), etc.

User device 102 may determine its physical location (block 810). Depending on the implementation, user device 102 may use Global Positioning System (GPS) receiver, information from base stations, and/or other means for determining its location.

User device 102 may determine whether the detected gesture/motion is one of the pre-defined gestures/motions necessary for events to occur (block 812). If the detected motion is not one of the specified motions (block 812: no), process 800 may proceed to block 818. Otherwise (block 812: yes), process may proceed to block 814.

User device 102 may test or determine whether values of other state variables are equal to specified values required for the event (block 814). For example, user device 102 may test or determine whether ambient noise is present, whether the incoming call is from a PRIVATE party, whether a volume button is being operated, whether a touch screen is being touched, identify the device whose microphone is being spoken to, etc. In another example, user device 102 may test/determine whether the call is an incoming call or outbound call. If any of the values is not equal to the corresponding, specified value (block 814: no), user device 102 may proceed to block 818.

If all of the values are equal to the corresponding specified values (block 814: yes), user device 102 may redirect its audio I/O (block 816). For example, assuming that user device 102 is within an automobile, user device 102 may pair with the hands-free device within the car and direct its audio I/O to the hands-free device.

User device 102 may determine if the call has ended/terminated (block 818). If the call has not terminated (block 818: no), user device 102 may continue to monitor its call state at block 818. Otherwise (block 818: yes), user device 818 may proceed to block 820, to restore the audio I/O configuration that was stored at block 802.

In a different implementation, rather than detecting that the call is terminated, user device 102 may continue to detect changes in its state and take further actions in accordance with the detected state. For example, user device 102 may restore the audio I/O configuration not when user terminates a call, but when the user moves user device 102 away from his head.

EXAMPLE 1

The following exemplary scenario is described with reference to records 602-1 and 602-3 in FIG. 6A. Assume that Johan owns a primary device (e.g., a mobile phone; D1 in record 602-1), which is Bluetooth paired with another device (e.g., a headset or hands-free device; D2 in record 602-1). The audio I/O of the primary device D1 is directed to the secondary device D2, by the virtue of the secondary device's coupling to the primary device D1. Also assume that, for this example, the primary device D1 does not use the status of the caller as PRIVATE or PUBLIC in the contact list to redirect its audio I/O.

Assume that the primary device detects an incoming call (call type fields 618-1). Johan may or may not answer the call at this point. In either case, Johan realizes that the battery is low on the secondary device D2 or that the call is private. Hence, Johan makes a gesture (e.g., moves the primary device D1 toward Johan's head) (gesture field 616-1 and direction field 616-1). Upon detection of the gesture via its sensors (as well as detection of other conditions in table 600), the primary device D1 directs the audio I/O to the speakers and microphone of the primary device D1 (action fields 624-1, indicating the rerouting of the audio I/O to D1). Johan then speaks to the caller via the primary device D1.

When Johan terminates the call or moves the primary device away from his head, the primary device D1 redirects the audio I/O to the secondary device D2 (e.g., restore its original audio I/O configuration).

CONCLUSION

As described above, user device 102 may detect a user's gesture or motion. If the gesture/motion indicates that the user is about to use a peripheral device (e.g., headset), user device itself 102, or another device, user device 102 may direct its audio input/output to the device about to be used. User device 102 may determine which device is about to be used based on different state variables associated with user device 102, peripheral device, and/or another device.

The foregoing description of implementations provides illustration, but is not intended to be exhaustive or to limit the implementations to the precise form disclosed. Modifications and variations are possible in light of the above teachings or may be acquired from practice of the teachings.

For example, in some implementations, peripheral device 104 may include a display (e.g., display glasses). In such implementations, user device 102, instead of just redirecting audio I/O, may redirect audio-visual I/O. Peripheral device 104 and/or hands-free device coupled with user device 102 may exchange multi-media input/output.

In another example, in this specification, while series of blocks have been described with regard to different processes, the order of the blocks in the processes may be modified in other implementations. In addition, non-dependent blocks may represent blocks that can be performed in parallel. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A first device comprising:
   an audio signal interface to a second device;
   a memory to store instructions;
   a processor configured to execute the instructions to:
      determine that there is an active call state due to an incoming call to the first device or an outbound call from the first device;
      monitor, during the active call state, an output of each component in a predefined set of input/output components of the first device and the second device;
      determine that the monitored output of each input/output component in the predefined set of input/output components has respective values that correspond to an event as indicated by a record of output conditions for the predefined set of input/output components, the record comprising a count of the number of times a user used audio components of the first device for audio input and output during prior instances of the event, and a count of the number of times the user used audio components of the second device for audio input and output during prior instances of the event; and
      direct audio input and audio output for the incoming or outbound call to the audio input components and audio output components, respectively, of the one of the first device or the second device that the record indicates has the highest count.

2. The first device of claim 1, wherein the first device includes one of:
   a smart phone; a tablet computer; a computer; or a laptop computer, and wherein the second device includes one or more of:
   a headset; speakers; a microphone; or a head-mounted display.

3. The first device of claim 1, wherein the predefined set of input/output components includes a motion sensor and a microphone;
   wherein the output of the motion sensor is an indication of movement; and
   wherein the output of the microphone comprises an indication that speech is being directed to the microphone.

4. The first device of claim 1, wherein the predefined set of input/output components includes a touch screen; and
   wherein the output of the touch screen comprises an indication that the screen is being touched.

5. The first device of claim 1, wherein the predefined set of input/output components includes a volume control component; and
   wherein the output of the volume control comprises an indication that the volume is being adjusted.

6. The first device of claim 1, wherein the predefined set of input/output components includes a proximity sensor and a power sensor;
   wherein the output of the proximity sensor comprises an indication that the sensor is in close proximity to a person; and
   wherein the output of the power sensor comprises an indication that a battery is discharged to a threshold level.

7. The first device of claim 1, wherein the second device is coupled to the first device via one of: a Bluetooth communication link; or a communication link over a cable or a wire.

8. The first device of claim 1, wherein a third device is paired with the first device; and
   wherein the processor is configured to:
      monitor during the active call state an output of each component in a predefined set of input/output components of the first device and the second device and the third device.

9. A method comprising:
   determining that there is an active call state due to an incoming call to a first device or an outbound call from the first device;
   monitoring, during the active call state, an output of each component in a predefined set of input/output components of the first device and a second device;

determining that the monitored output of each of the components in the predefined set of input/output components has respective values that correspond to an event as indicated by a record of output conditions for the predefined set of input/output components, the record comprising a count of the number of times a user used audio components of the first device for audio input and output during prior instances of the event, and a count of the number of times the user used audio components of the second device for audio input and output during prior instances of the event; and directing audio input and output for the incoming or outbound call to the audio components of the one of the first device or the second device that the record indicates has the highest count.

10. The method claim 9, wherein the predefined set of input/output components includes a motion sensor and a microphone;

wherein the output of the motion sensor is an indication of movement; and wherein the output of the microphone comprises an indication that speech is being directed to the microphone.

11. The method of claim 9, wherein the predefined set of input/output components includes a touch screen; and wherein the output of the touch screen comprises an indication that the screen is being touched.

12. The method of claim 9, wherein the predefined set of input/output components includes a volume control component; and wherein the output of the volume control comprises an indication that the volume is being adjusted.

13. The method of claim 9, wherein the predefined set of input/output components includes a proximity sensor and a power sensor;

wherein the output of the proximity sensor comprises an indication that the sensor is in close proximity to a person; and wherein the output of the power sensor comprises an indication that a battery is discharged to a threshold level.

14. A tangible and non-transitory computer-readable storage device, comprising one or more computer-executable instructions, wherein when executed by one or more processors, the computer-executable instructions cause the one or more processors to:

determine that there is an active call state due to an incoming call to a first device or an outbound call from the first device;

monitor, during the active call state, an output of each component in a predefined set of input/output components of the first device and a second device;

determine that the monitored output of each of the components in the predefined set of input/output components has respective values that correspond to an event as indicated by a record of output conditions for the predefined set of input/output components, the record comprising a count of the number of times a user used audio components of the first device for audio input and output during prior instances of the event, and a count of the number of times the user used audio components of the second device for audio input and output during prior instances of the event; and direct audio input and output for the incoming or outbound call to the audio components of the one of the first device or the second device that the record indicates has the highest count.

* * * * *